US011423609B2

(12) United States Patent
Lee et al.

(10) Patent No.: US 11,423,609 B2
(45) Date of Patent: Aug. 23, 2022

(54) APPARATUS AND METHOD FOR GENERATING POINT CLOUD

(71) Applicant: MAXST CO., LTD., Seoul (KR)

(72) Inventors: Hyung Min Lee, Gyeonggi-do (KR); Kyu Sung Cho, Sejong-si (KR); Jae Wan Park, Ulsan (KR)

(73) Assignee: MAXST CO., LTD., Seoul (KR)

( * ) Notice: Subject to any disclaimer, the term of this patent is extended or adjusted under 35 U.S.C. 154(b) by 121 days.

(21) Appl. No.: 16/806,137

(22) Filed: Mar. 2, 2020

(65) Prior Publication Data

US 2021/0201567 A1  Jul. 1, 2021

(30) Foreign Application Priority Data

Dec. 27, 2019  (KR) ........................ 10-2019-0176349

(51) Int. Cl.
*G06T 17/00* (2006.01)

(52) U.S. Cl.
CPC .... *G06T 17/00* (2013.01); *G06T 2207/10028* (2013.01)

(58) Field of Classification Search
None
See application file for complete search history.

(56) References Cited

U.S. PATENT DOCUMENTS

| 10,778,951 B2 | 9/2020 | Yoshikawa et al. |
| 2019/0128670 A1* | 5/2019 | Chen ........................ G06T 17/00 |

FOREIGN PATENT DOCUMENTS

| JP | 2005-056295 A | 3/2005 |
| KR | 10-1604037 B1 | 3/2016 |
| KR | 10-2016-0082158 A | 7/2016 |
| KR | 101661600 B1 * | 9/2016 |
| KR | 10-1781994 B1 | 9/2017 |
| KR | 10-2019-0108721 A | 9/2019 |

OTHER PUBLICATIONS

Machine Translation of KR101661600B1 (Year: 2016).*
Li et al.; "Automatic registration of panoramic image sequence and mobile laser scanning data using semantic features;" Feb. 2018; ISPRS Journal of Photogrammetry and Remote Sensing vol. 136, pp. 41-57 (Year: 2018).*
Office action dated Feb. 22, 2021 from Korea Intellectual Property Office in a counterpart Korean Patent Application No. 10-2019-0176349 (English translation is also submitted herewith.).
Office action dated Aug. 29, 2021 from Korea Intellectual Property Office in a counterpart Korean Patent Application No. 10-2019-0176349 (English translation is also submitted herewith.).

* cited by examiner

*Primary Examiner* — Peter Hoang
(74) *Attorney, Agent, or Firm* — The PL Law Group, PLLC

(57) ABSTRACT

A point cloud information generation apparatus according to an embodiment includes a 360-degree image acquirer configured to acquire a 360-degree image of a three-dimensional (3D) space, a point cloud information generator configured to generate first point cloud information for the 3D space from the 360-degree image, and a viewpoint orientation image generator configured to generate a plurality of viewpoint orientation images from the 360-degree image based on a reference viewpoint in the 360-degree image, wherein the point cloud information generator further configured to generate second point cloud information for the 3D space from the plurality of viewpoint orientation images.

18 Claims, 14 Drawing Sheets

APPARATUS AND METHOD FOR GENERATING POINT CLOUD

CROSS-REFERENCE TO RELATED APPLICATION

This application claims priority to and the benefit of Korean Patent Application No. 10-2019-0176349, filed on Dec. 27, 2019, the disclosure of which is incorporated herein by reference in its entirety.

BACKGROUND

1. Field

Embodiments of the present disclosure relate to a technique for generating point cloud information for a three-dimensional space.

2. Discussion of Related Art

Generally, a Structure from Motion (SfM) algorithm is used as a method of performing precise three-dimensional (3D) reconstruction on a region of a certain size or more, such as a large indoor space or an outdoor space. The SfM algorithm has a process of extracting feature points of images, matching the feature points between the images, and calculating the matched feature points by triangulation to reconstruct 3D points. In addition, there are various SfM algorithms according to detailed differences in each process. Also, the SfM algorithm uses images captured by a pinhole camera, which is used the most in everyday life and may use images captured by a camera having a fisheye lens or images captured by a 360-degree camera if necessary.

When the SfM algorithm is performed using images captured by the pinhole camera, a large number of images are required to reconstruct a stable 3D model. In this case, a dense 3D model can be reconstructed, but it takes quite a long time to perform the SfM algorithm. Also, if the number of images is not sufficient, the reconstructed 3D model is broken or is geometrically misshapen, such as in a drift error.

In order to solve the above problems, the SfM algorithm may be performed using a 360-degree image. In the case of the 360-degree image, unlike an image captured by a pinhole camera, the geometric shape of the entire area to be captured is contained in one image. Accordingly, the probability of drift error is significantly lower when performing the SfM algorithm. However, a 360-degree image is severely distorted in a top-end region and a bottom-end region, and thus there is a limitation in processing the 360-degree image to be two-dimensional projection images. In addition, a 360-degree image has a lower resolution than information included in the image, and thus it is difficult to generate a dense 3D point cloud.

SUMMARY

Embodiments of the present disclosure are directed to providing an apparatus and method for generating a point cloud to perform three-dimensional reconstruction on a 360-degree image through a two-step point cloud information generating process.

According to an aspect of the present disclosure, there is provided a point cloud information generation apparatus including a 360-degree image acquirer configured to acquire a 360-degree image of a three-dimensional (3D) space, a point cloud information generator configured to generate first point cloud information for the 3D space from the 360-degree image, and a viewpoint orientation image generator configured to generate a plurality of viewpoint orientation images from the 360-degree image based on a reference viewpoint in the 360-degree image, wherein the point cloud information generator generates second point cloud information for the 3D space from the plurality of viewpoint orientation images.

Each of the viewpoint orientation images may be an image obtained by projecting a region corresponding to a specific viewpoint in the 360-degree image onto a two-dimensional (2D) plane.

The viewpoint orientation image generator may generate a plurality of viewpoint orientation images including a viewpoint orientation image corresponding to the reference viewpoint and viewpoint orientation images corresponding to one or more viewpoints shifted with respect to the reference viewpoint.

The viewpoint orientation image generator may generate the plurality of viewpoint orientation images based on at least one of a predetermined image resolution and field of view (FoV).

The point cloud information generator may calculate a correlation between the plurality of viewpoint orientation images based on information for each of the plurality of viewpoint orientation images and may generate the second point cloud information based on the correlation.

The information for each of the plurality of viewpoint orientation images may include at least one of location information of each of the plurality of viewpoint orientation images, orientation information of each of the plurality of viewpoint orientation images, and a camera parameter corresponding to each of the plurality of viewpoint orientation images.

The correlation may include at least one of distances between locations corresponding to the plurality of viewpoint orientation images and angles between viewpoint orientations of the plurality of viewpoint orientation images.

The point cloud information generation apparatus may further include a mapper configured to map location information of the 360-degree image to a map including the 3D space.

The viewpoint orientation image generator may generate the plurality of viewpoint orientation images based on a coordinate system of the map.

The point cloud information generator may generate the second point cloud information based on a coordinate system of the map.

According to another aspect of the present disclosure, there is provided a point cloud information generation method including acquiring a 360-degree image of a three-dimensional (3D) space, generating first point cloud information for the 3D space from the 360-degree image, generating a plurality of viewpoint orientation images from the 360-degree image based on a reference viewpoint in the 360-degree image, and generating second point cloud information for the 3D space from the plurality of viewpoint orientation images.

Each of the viewpoint orientation images may be an image obtained by projecting a region corresponding to a specific viewpoint in the 360-degree image onto a two-dimensional (2D) plane.

The generating of a plurality of viewpoint orientation images may include generating a plurality of viewpoint orientation images including a viewpoint orientation image corresponding to the reference viewpoint and viewpoint orientation images corresponding to one or more viewpoints shifted with respect to the reference viewpoint.

The generating of a plurality of viewpoint orientation images may include generating the plurality of viewpoint orientation images based on at least one of a predetermined image resolution and field of view (FoV).

The generating of second point cloud information may include calculating a correlation between the plurality of viewpoint orientation images based on information for each of the plurality of viewpoint orientation images and generating the second point cloud information based on the correlation.

The information for each of the plurality of viewpoint orientation images may include at least one of location information of each of the plurality of viewpoint orientation images, orientation information of each of the plurality of viewpoint orientation images, and a camera parameter corresponding to each of the plurality of viewpoint orientation images.

The correlation may include at least one of distances between locations corresponding to the plurality of viewpoint orientation images and angles between viewpoint orientations of the plurality of viewpoint orientation images.

The point cloud information generation method may further include mapping location information of the 360-degree image to a map including the 3D space after the generating of first point cloud information.

The generating of a plurality of viewpoint orientation images may include generating the plurality of viewpoint orientation images based on a coordinate system of the map.

The generating of second point cloud information may include generating the second point cloud information based on a coordinate system of the map.

BRIEF DESCRIPTION OF THE DRAWINGS

One or more of the above and other aspects, features and advantages of the present disclosure will become more apparent to those of ordinary skill in the art by describing exemplary embodiments thereof in detail with reference to the accompanying drawings, in which.

DETAILED DESCRIPTION

Hereinafter, exemplary embodiments will be described with reference to the accompanying drawings. The following detailed description is provided to assist the reader in gaining a comprehensive understanding of methods, apparatuses, and/or systems described herein. However, this is merely an example, and the present disclosure is not limited thereto.

In describing the embodiments, when it is determined that a detailed description of a known technique associated with the present disclosure would unnecessarily obscure the subject matter of the present disclosure, the detailed description will be omitted. Also, terms used herein are defined in consideration of functions and may be changed depending on a user, the intent of an operator, or a custom. Therefore, the definitions should be made based on the contents throughout the specification. The terminology used herein is only for the purpose of describing embodiments and should not be limiting. The singular forms "a," "an," and "the" are intended to include the plural forms as well, unless the context clearly indicates otherwise. Also, the terms "comprises," "comprising," "includes," and/or "including" specify stated features, integers, steps, operations, elements, components, and/or some or a combination thereof, but should not be construed to preclude the presence or possibility of one or more other features, integers, steps, operations, elements, or some or a combination thereof.

Figure 1:
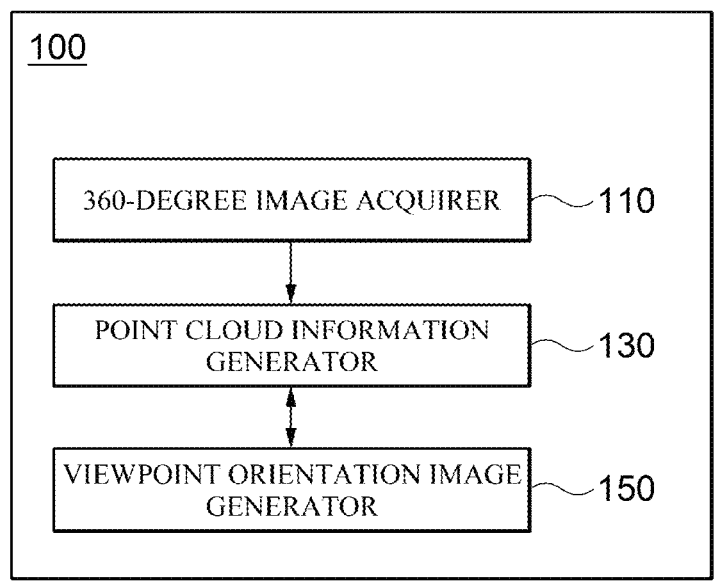
FIG. 1 is a block diagram of a point cloud generation apparatus according to an embodiment.

FIG. 1 is a block diagram of a point cloud information generation apparatus 100 according to an embodiment.

Referring to FIG. 1, the point cloud information generation apparatus 100 includes a 360-degree image acquirer 110, a point cloud information generator 130, and a viewpoint orientation image generator 150.

In an embodiment, the 360-degree image acquirer 110, the point cloud information generator 130, and the viewpoint orientation image generator 150 are implemented using one or more physically separated apparatuses or by one or more processors or a combination of software and one or more processors. Unlike the illustrated example, the 360-degree image acquirer 110, the point cloud information generator 130, and the viewpoint orientation image generator 150 may not be clearly distinguished in a specific operation.

The 360-degree image acquirer 110 acquires a 360-degree image of a three-dimensional (3D) image.

In this case, the 3D space may be a space including one or more 3D objects. For example, the 3D space may include indoor spaces such as the inside of a building as well as outdoor spaces such as roadsides and parks.

A 360-degree image may be an image obtained by capturing a 3D space in 360 degrees with respect to a horizontal direction.

Figure 2:
FIG. 2 is an exemplary diagram of a 360-degree image according to an embodiment.

For example, as shown in FIG. 2, the 360-degree image may be a panoramic image. In this case, the 360-degree image may be a spherical panoramic image or a cylindrical panoramic image, but the present disclosure is not limited thereto. The 360-degree image may be various types of images depending on the embodiment.

The 360-degree image may be an image captured by a 360-degree camera or an image obtained by combining a plurality of images of a 3D space captured by one or more cameras. However, the above-described 360-degree image generation method is merely an example, and the 360-degree image may be generated through various methods.

Also, the 360-degree image acquirer 110 may acquire a 360-degree image of each of a plurality of 3D spaces.

The point cloud information generator 130 generates first point cloud information for a 3D space from the 360-degree image.

In an embodiment, the point cloud information generator 130 may generate the first point cloud information using a Structure from Motion (SfM) algorithm.

In this case, the first point cloud information may include location information and the like of point clouds generated from the 360-degree image.

Also, the point cloud information generator 130 may generate the location information of the 360-degree image using the SfM algorithm.

In this case, the location information of the 360-degree image may be information indicating a location at which the 360-degree image is captured in any coordinate system.

The viewpoint orientation image generator 150 generates a plurality of viewpoint orientation images from the 360-degree image based on a reference viewpoint in the 360-degree image.

In this case, the reference viewpoint may be a viewpoint which is a reference for generating a viewpoint orientation image in the 360-degree image.

Figure 3:
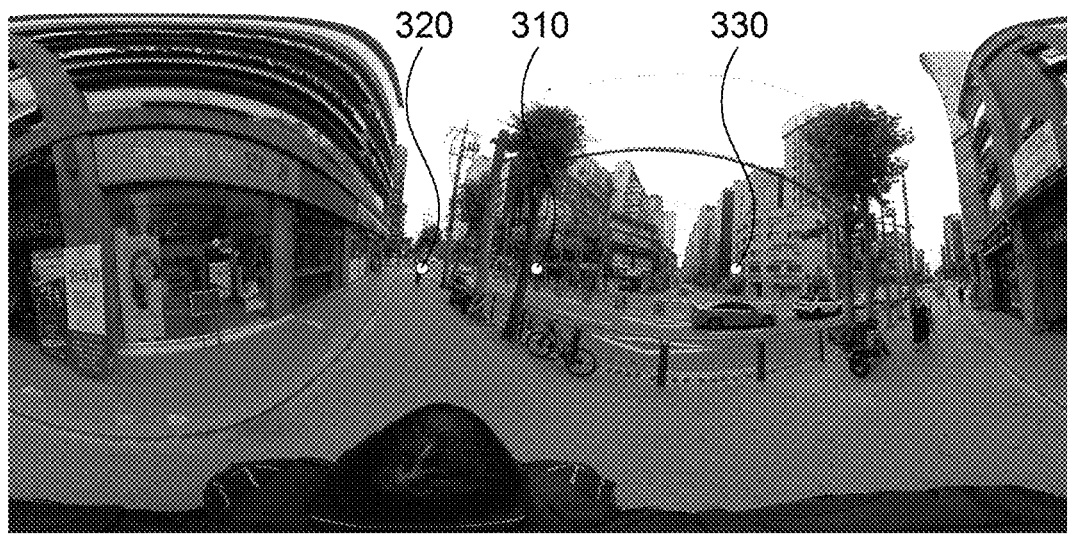
FIG. 3 is an exemplary diagram of a reference viewpoint according to an embodiment.

For example, as shown in FIG. 3, a user may set the reference viewpoint in the 360-degree image through various methods.

Referring to FIG. 3, the center 310 of the 360-degree image may be set as the reference viewpoint. According to another embodiment, a moving line direction 320 of a person who has taken the 360-degree image may be set as the reference viewpoint in the 360-degree image. Also, according to another embodiment, a north direction 330 with respect to the azimuth of an actual 3D space may be set as the reference viewpoint in the 360-degree image.

However, the reference viewpoint shown in FIG. 3 is merely an example, and the reference viewpoint may be set based on various criteria according to a user's settings.

The viewpoint orientation image may be an image obtained by projecting a region corresponding to a specific viewpoint in the 360-degree image onto a two-dimensional (2D) plane.

For example, the viewpoint orientation image generator 150 may generate a viewpoint orientation image in consideration of a relationship between a coordinate system on a 360-degree image and a coordinate system on a plane image.

Thus, by generating the viewpoint orientation image from the 360-degree image, a distortion-corrected plane image of a region of the 360-degree image corresponding to a specific viewpoint may be generated.

The above-described viewpoint orientation image generation method is merely an example, and viewpoint orientation image generation methods may vary depending on the embodiment.

In an embodiment, the viewpoint orientation image generator 150 may generate a plurality of viewpoint orientation images including a viewpoint orientation image corresponding to the reference viewpoint and viewpoint orientation images corresponding to one or more viewpoints shifted with respect to the reference viewpoint.

For example, the viewpoint orientation image generator 150 may generate the viewpoint orientation image corresponding to the reference viewpoint from the 360-degree images. In this case, the viewpoint orientation image corresponding to the reference viewpoint may be an image obtained by projecting a region of the 360-degree image corresponding to the reference viewpoint onto a 2D plane.

Figure 4A:
FIGS. 4A to 4C are exemplary diagrams of a viewpoint orientation image corresponding to the reference viewpoint according to an embodiment.

For example, when the center 310 of the 360-degree image is set as the reference viewpoint, the viewpoint orientation image corresponding to the reference viewpoint may be generated as shown in an image shown in FIG. 4A.

Figure 4B:

As another example, when the moving line direction 320 of the person who has taken the 360-degree image is set as the reference viewpoint, the viewpoint orientation image corresponding to the reference viewpoint may be generated as shown in an image shown in FIG. 4B.

Figure 4C:

As still another example, when the north direction 330 with respect to the azimuth of the actual 3D space is set as the reference viewpoint, the viewpoint orientation image corresponding to the reference viewpoint may be generated as shown in an image shown in FIG. 4C.

Also, the viewpoint orientation image generator 150 may generate the viewpoint orientation images corresponding to the one or more viewpoints shifted with respect to the reference viewpoint from the 360-degree images. In this case, the one or more viewpoints may be viewpoints that are shifted upward, downward, leftward, or rightward at regular intervals with respect to the reference viewpoint.

Figure 5A:
FIGS. 5A to 5C are exemplary diagrams of a viewpoint orientation image corresponding to each of one or more viewpoints shifted with respect to the reference viewpoint according to an embodiment.
Figure 5B:
Figure 5C:

For example, it is assumed that the viewpoint orientation image corresponding to the reference viewpoint is an image shown in FIG. 5A. In this case, a viewpoint orientation image corresponding to a viewpoint shifted rightward with respect to the reference viewpoint in the 360-degree image may be generated as shown in an image shown in FIG. 5B. Also, a viewpoint orientation image corresponding to a viewpoint shifted upward with respect to the reference viewpoint in the 360-degree image may be generated as shown in an image shown in FIG. 5C.

In the above-described example, the viewpoint orientation image corresponding to the viewpoint shifted rightward or upward with respect to the reference viewpoint has been described, but the present disclosure is not limited thereto.

For example, the one or more viewpoints shifted with respect to the reference viewpoint may vary depending on the shift direction and shift interval. Thus, the viewpoint orientation images corresponding to the one or more viewpoints shifted with respect to the reference viewpoint may vary.

In detail, the viewpoint orientation image generator 150 may generate viewpoint orientation images corresponding to the reference viewpoint and a plurality of viewpoints shifted by 45 degrees, 90 degrees, 135 degrees, 180 degrees, 235 degrees, 270 degrees, and 315 degrees with respect to the reference viewpoint. Also, the viewpoint orientation image generator 150 may generate viewpoint orientation images corresponding to the viewpoint shifted upward with respect to the reference viewpoint and viewpoint orientation images corresponding to a plurality of viewpoints shifted by 45 degrees, 90 degrees, 135 degrees, 180 degrees, 235 degrees, 270 degrees, and 315 degrees with respect to the viewpoint shifted upward. In this case, 16 viewpoint orientation images may be generated from one 360-degree image.

However, the above-described example is merely an example, and the method of setting one or more viewpoints and the viewpoint orientation image generation method may vary.

Also, in an embodiment, the viewpoint orientation image generator 150 may generate a plurality of viewpoint orientation images based on at least one of a predetermined image resolution and field of view (FoV).

For example, a user may determine the resolution of a viewpoint orientation image to be generated. In this case, the viewpoint orientation image generator 150 may generate a viewpoint orientation image having the resolution determined by the user.

Also, the user may set the FoV of a viewpoint orientation image to be generated.

Figure 6A:
FIGS. 6A and 6B are exemplary diagrams of a viewpoint orientation image generated based on a field of view according to an embodiment.

For example, as shown in FIG. 6A, when the user sets the FoV of the viewpoint orientation image to be generated to be 60 degrees, the viewpoint orientation image may be generated as an image having an FoV of 60 degrees.

Figure 6B:

As another example, as shown in FIG. 6B, when the user sets the FoV of the viewpoint orientation image to be generated to be 90 degrees, the viewpoint orientation image may be generated as an image having an FoV of 90 degrees.

In the above-described example, the FoV of the viewpoint orientation image has been described as 60 degrees or 90 degrees, but the present disclosure is not limited thereto. The FoV of the viewpoint orientation image may vary depending on settings.

Also, when the 360-degree image acquirer 110 acquires a 360-degree image of each of a plurality of 3D spaces, the viewpoint orientation image generator 150 may generate a plurality of viewpoint orientation images from the plurality of 360-degree images. In this case, the viewpoint orientation image generator 110 may generate the plurality of viewpoint orientation images based on the reference viewpoints of the plurality of 360-degree images.

The point cloud information generator 130 may generate second point cloud information for the 3D space from the plurality of viewpoint orientation images.

In an embodiment, the point cloud information generator 130 may generate the second point cloud information using the SfM algorithm.

In this case, the second point cloud information may include location information and the like of point clouds generated from the plurality of viewpoint orientation images.

Accordingly, the point cloud information generator 130 may generate point cloud information through two steps by generating first point cloud information for a 3D space from a 360-degree image of the 3D space and generating second point cloud information from a plurality of viewpoint orientation images generated from the 360-degree image. Thus, the point cloud information generator 130 may generate stable and dense point cloud information for a 3D space.

In an embodiment, the point cloud information generator 130 may calculate a correlation between the plurality of viewpoint orientation images based on information for each of the plurality of viewpoint orientation images and may generate second point cloud information based on the calculated correlation.

In this case, the information for each of the plurality of viewpoint orientation images may include a variety of information related to the viewpoint orientation images such as location information of each of the plurality of viewpoint orientation images, orientation information of each of the plurality of viewpoint orientation images, a camera parameter corresponding to each of the plurality of viewpoint orientation images, etc.

In detail, when the SfM algorithm is applied to a 360-degree image in order to generate first point cloud information, the point cloud information generator 130 may also generate location information of the 360-degree images. Also, depending on settings, the plurality of viewpoint orientation images may be generated based on different viewpoints, FoVs, and the like or from different 360-degree images. Accordingly, the point cloud information generator 130 may generate information for each of the plurality of viewpoint orientation images based on the location information of the 360-degree image included in the viewpoint orientation image, the reference viewpoint and FoV corresponding to when the viewpoint orientation image is generated, and the like.

Also, the correlation between the plurality of viewpoint orientation images may be information for determining whether the plurality of viewpoint orientation images are related to each other.

For example, the correlation between the plurality of viewpoint orientation images may include distances between locations corresponding to the plurality of viewpoint orientation images, angles between viewpoint orientations of the plurality of viewpoint orientation images, and the like.

In detail, the point cloud information generator 130 may determine viewpoint orientation images related to each other among the plurality of viewpoint orientation images based on information for each of the plurality of viewpoint orientation images and may generate second point cloud information by applying the SfM algorithm to the viewpoint images related to each other.

For example, among the plurality of viewpoint orientation images, a first viewpoint orientation image and a second viewpoint orientation image may include an overlapped region depending on the distance between the first viewpoint orientation image and the second viewpoint orientation image, the viewpoint orientations of the first viewpoint orientation image and the second viewpoint orientation image, etc.

In this case, when the overlapped region included in the first viewpoint orientation image and the second viewpoint orientation image is large, the point cloud information generator 130 may determine that the first viewpoint orientation image and the second viewpoint orientation image are images related to each other and may apply the SfM algorithm to the first viewpoint orientation image and the second viewpoint orientation images.

On the other hand, when the overlapped region included in the first viewpoint orientation image and the second viewpoint orientation image is small or does not exist, the point cloud information generator 130 may determine that the first viewpoint orientation image and the second viewpoint orientation image are images unrelated to each other and may not perform the SfM algorithm.

Thus, the point cloud information generator 130 may shorten a time required to perform the SfM algorithm by applying the SfM algorithm to correlated viewpoint orientation images.

Figure 7:
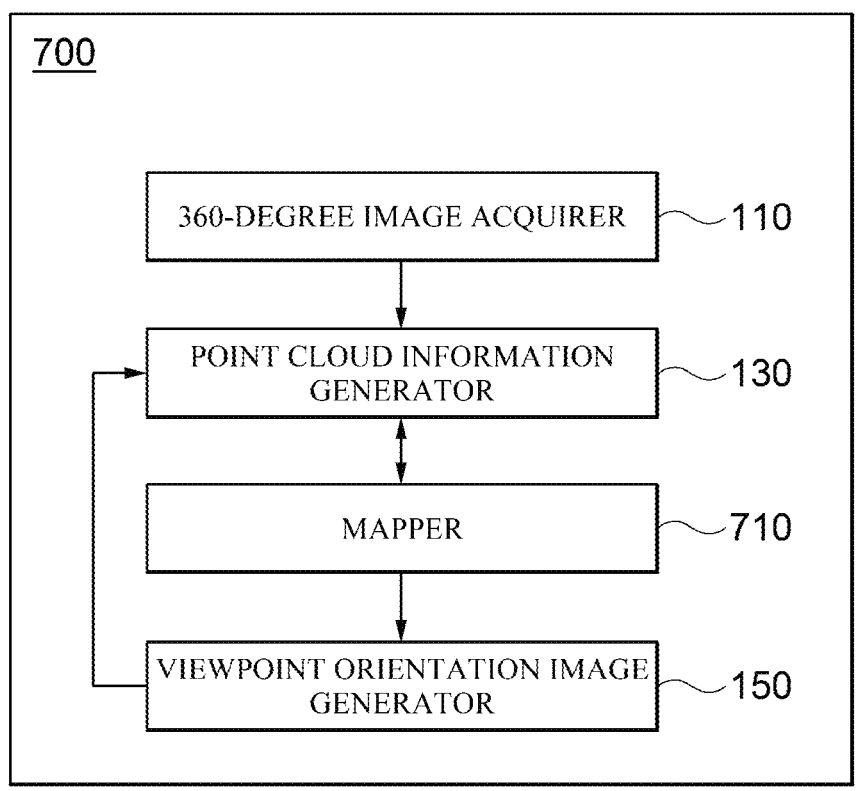
FIG. 7 is a block diagram of a point cloud information generating apparatus according to an additional embodiment.

FIG. 7 is a block diagram of a point cloud information generating apparatus 700 according to an additional embodiment.

Referring to FIG. 7, the point cloud information generating apparatus 700 may further include a mapper 710. In an example shown in FIG. 7, a 360-degree image acquirer 110, a point cloud information generator 130, and a viewpoint orientation image generator 150 have the same configurations as those shown in FIG. 1, and thus a detailed description thereof will be omitted.

The mapper 710 may map location information of a 360-degree image to a map including a 3D space.

In detail, the map is a map that represents the real world, and a coordinate system including latitude and longitude may be applied to the map.

For example, it is assumed that the 3D space indicates "51-gil, Gangnam-daero, Seocho-gu, Seoul." The mapper 710 may map location information of a 360-degree image captured at "51-gil, Gangnam-daero, Seocho-gu, Seoul" to the map. Also, when there are a plurality of 360-degree images, the mapper 710 may map the location information of each of the plurality of 360-degree images to the map.

In an embodiment, the viewpoint orientation image generator 150 may generate the plurality of viewpoint orientation images based on the coordinate system of the map.

In detail, a reference viewpoint may be set based on the coordinate system of the map.

For example, when a reference point is set in the map, an orientation from a position where a 360-degree image is captured toward the reference point may be set as the reference viewpoint.

In this case, the viewpoint orientation image generator 150 may generate a plurality of viewpoint orientation images based on the set reference viewpoint. In this case, in order to generate the viewpoint orientation image, the viewpoint orientation image generation method that has been described with reference to FIG. 1 may be applied without any modification.

In the above-described example, the reference viewpoint is set based on the coordinate system of the map. In addition to the above example, however, various methods may be applied to generate a plurality of viewpoint orientation images based on the coordinate system of the map.

Also, in an embodiment, the point cloud information generator 150 may generate second point cloud information based on the coordinate system of the map.

For example, the point cloud information generator 150 may generate location information, orientation information, camera parameters, and the like of the plurality of viewpoint orientation images based on the coordinate system of the map. Also, the point cloud information generator 150 may calculate a correlation between the plurality of viewpoint orientation images based on information for each of the plurality of viewpoint orientation images and the coordinate system of the map and may generate the second point cloud information based on the calculated correlation.

In this case, in order to generate the second point cloud information, the second-point-cloud information generation method that has been described with reference to FIG. 1 may be applied without any modification.

An example of generating information for each of the plurality of viewpoint orientation images based on the coordinate system of the map, an example of calculating the correlation between the plurality of viewpoint orientation images, and an example of generating the second point cloud information have been described above. However, in addition to the above-described examples, various methods may be applied to generate the second point cloud information based on the coordinate system of the map.

Figure 8A:
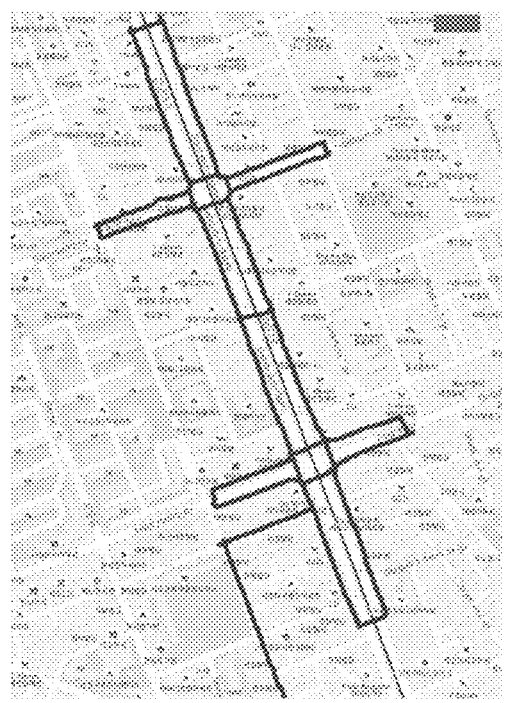
FIGS. 8A to 8B are diagrams illustrating an example of mapping to a map according to an embodiment.
Figure 8B:
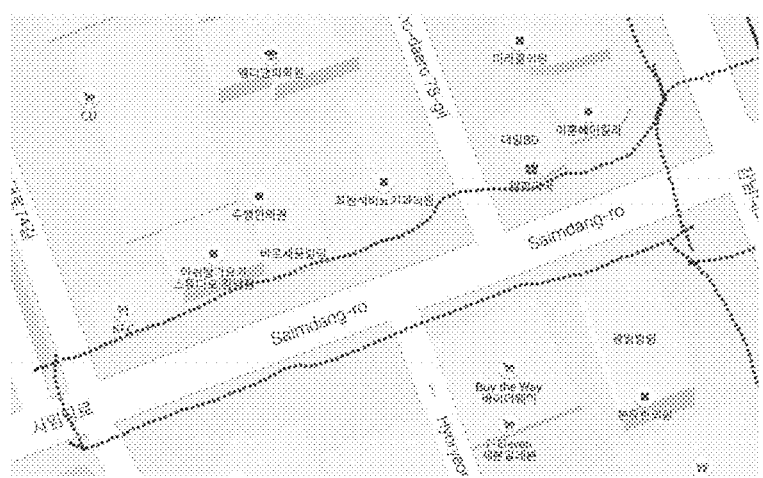

FIGS. 8A to 8B are diagrams illustrating an example of mapping to a map according to an embodiment.

In detail, FIG. 8A shows a map to which location information of a plurality of 360-degree images obtained by capturing the entirety of a route including a plurality of 3D spaces using a 360-degree camera is mapped.

Also, FIG. 8B shows a map to which location information of a plurality of 360-degree images obtained by capturing a portion of the entire route using a 360-degree camera is mapped.

In this case, points displayed on the map represent the mapped location information of the plurality of 360-degree images.

Figure 9:
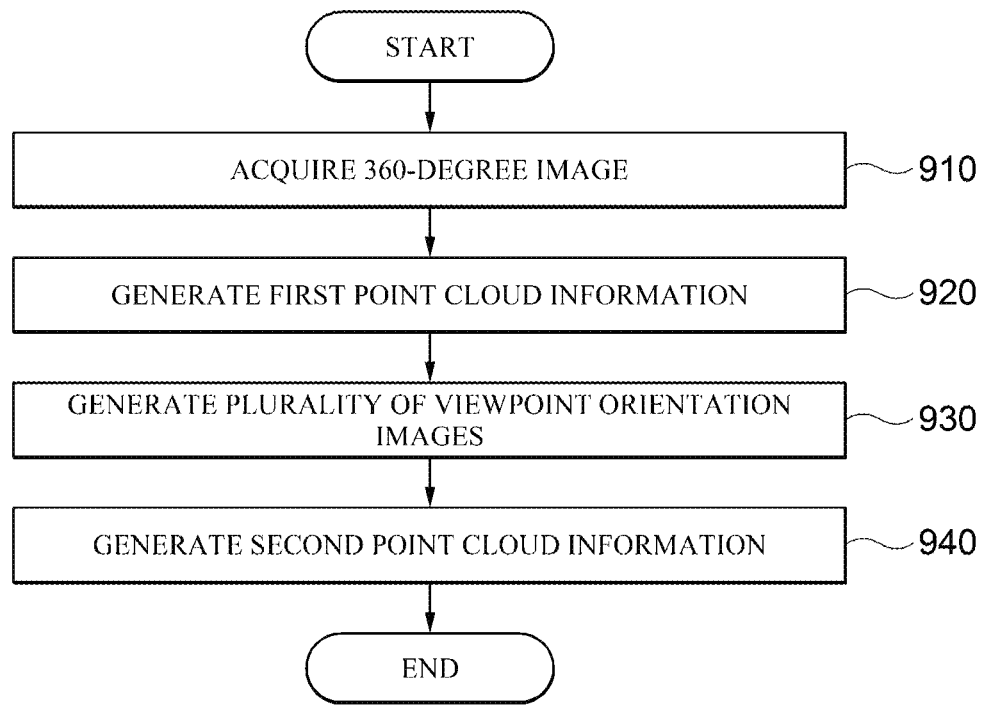
FIG. 9 is a flowchart of a point cloud generation method according to an embodiment.

FIG. 9 is a flowchart of a point cloud generation method according to an embodiment.

The method shown in FIG. 9 may be performed by, for example, the point cloud information generation apparatus 100 shown in FIG. 1.

Referring to FIG. 9, the point cloud information generation apparatus 100 acquires a 360-degree image of a 3D space (910).

Subsequently, the point cloud information generation apparatus 100 generates first point cloud information for the 3D space from the 360-degree images (920).

Subsequently, the point cloud information generation apparatus 100 generates a plurality of viewpoint orientation images from the 360-degree image based on a reference point in the 360-degree image (930).

In this case, the point cloud information generation apparatus 100 may generate a plurality of viewpoint orientation images including a viewpoint orientation image corresponding to the reference viewpoint and viewpoint orientation images corresponding to one or more viewpoints shifted with respect to the reference viewpoint.

Also, the point cloud information generation apparatus 100 may generate the plurality of viewpoint orientation images based on at least one of a predetermined image resolution and FoV.

Subsequently, the point cloud information generation apparatus 100 generates second point cloud information for the 3D space from the plurality of viewpoint orientation images (940).

Figure 10:
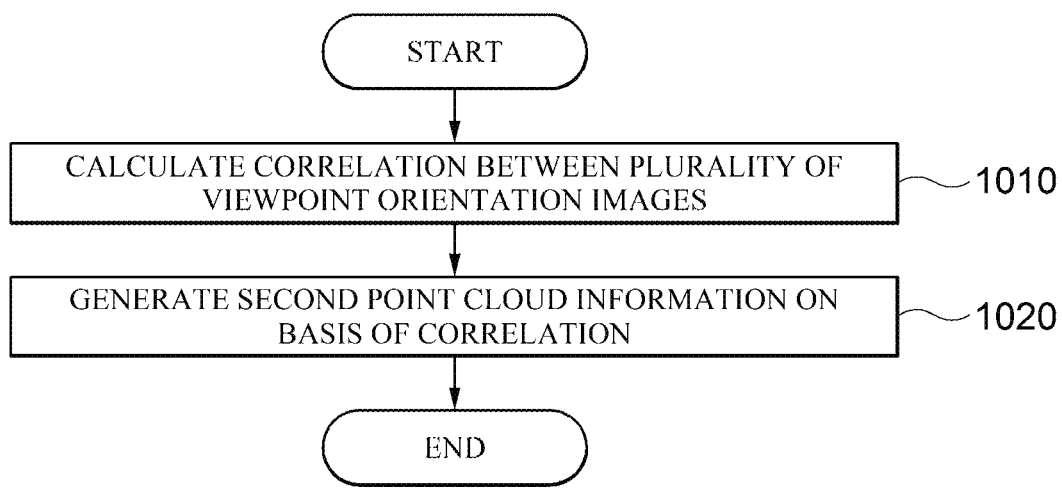
FIG. 10 is a flowchart of a method of generating second point cloud information according to an embodiment.

FIG. 10 is a flowchart of a method of generating second point cloud information according to an embodiment.

The method shown in FIG. 10 may be performed by, for example, the point cloud information generation apparatus 100 shown in FIG. 1.

Referring to FIG. 10, the point cloud information generation apparatus 100 may calculate a correlation between a plurality of viewpoint orientation images based on information for each of the plurality of viewpoint orientation images (1010).

Subsequently, the point cloud information generation apparatus 100 may generate second point cloud information based on the correlation (1020).

Figure 11:
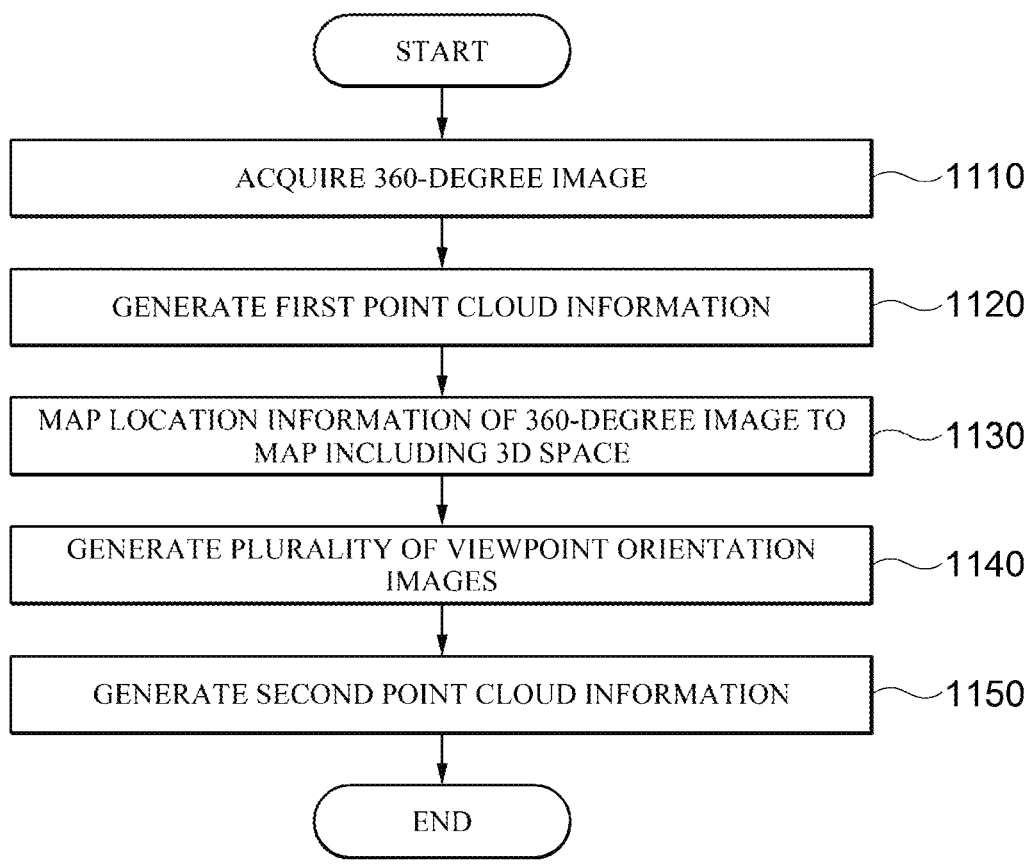
FIG. 11 is a flowchart of a point cloud information generation method according to an additional embodiment.

FIG. 11 is a flowchart of a point cloud information generation method according to an additional embodiment.

The method shown in FIG. 11 may be performed by, for example, the point cloud information generation apparatus 700 shown in FIG. 7.

In the example shown in FIG. 11, operations 1110, 1120, 1140, and 1150 are the same as operations 910 to 940 shown in FIG. 9, and thus a repetitive description thereof will be omitted.

Referring to FIG. 11, the point cloud information generation apparatus 700 may map location information of a 360-degree image to a map including a 3D space (1130).

Subsequently, the point cloud information generation apparatus 700 may generate a plurality of viewpoint orientation images based on a coordinate system of the map.

Subsequently, the point cloud information generation apparatus 700 may generate second point cloud information based on the coordinate system of the map.

In the flowcharts illustrated in FIGS. 9 to 11, the methods have been described as having a plurality of operations. However, at least some of the operations may be performed in the exchanged order, performed in combination with another operation, omitted, divided into sub-operations and then performed, or performed in addition to one or more operations that are not shown.

Figure 12:
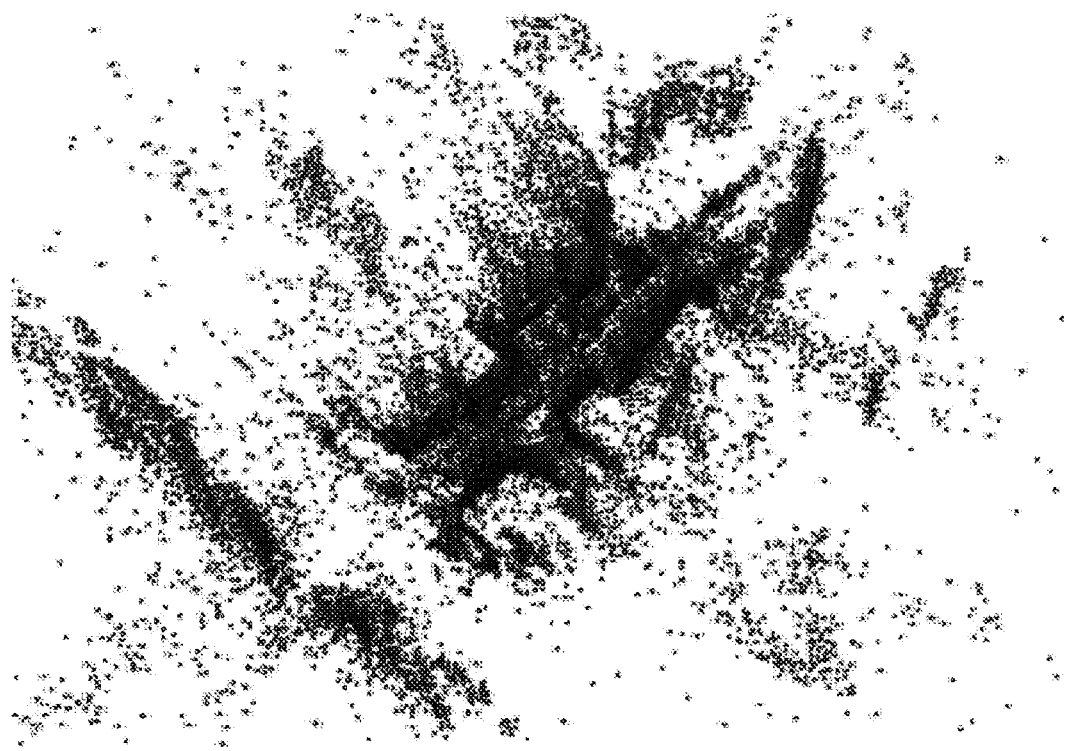
FIG. 12 is an exemplary diagram of first point cloud information for a plurality of three-dimensional (3D) spaces according to an embodiment.

FIG. 12 is an exemplary diagram of first point cloud information for a plurality of 3D spaces according to an embodiment. Also, FIG. 13 is an exemplary diagram of first point cloud information and second point cloud information for a plurality of 3D spaces according to an embodiment.

In detail, FIG. 12 is a diagram showing an example in which first point cloud information is generated from 360-degree images of the plurality of 3D spaces. Also, FIG. 13 is a diagram showing an example in which first point cloud information is generated from a plurality of 360-degree images of the plurality of 3D spaces and second point cloud information is generated from a plurality of viewpoint orientation images generated from the plurality of 360-degree images.

Figure 13:
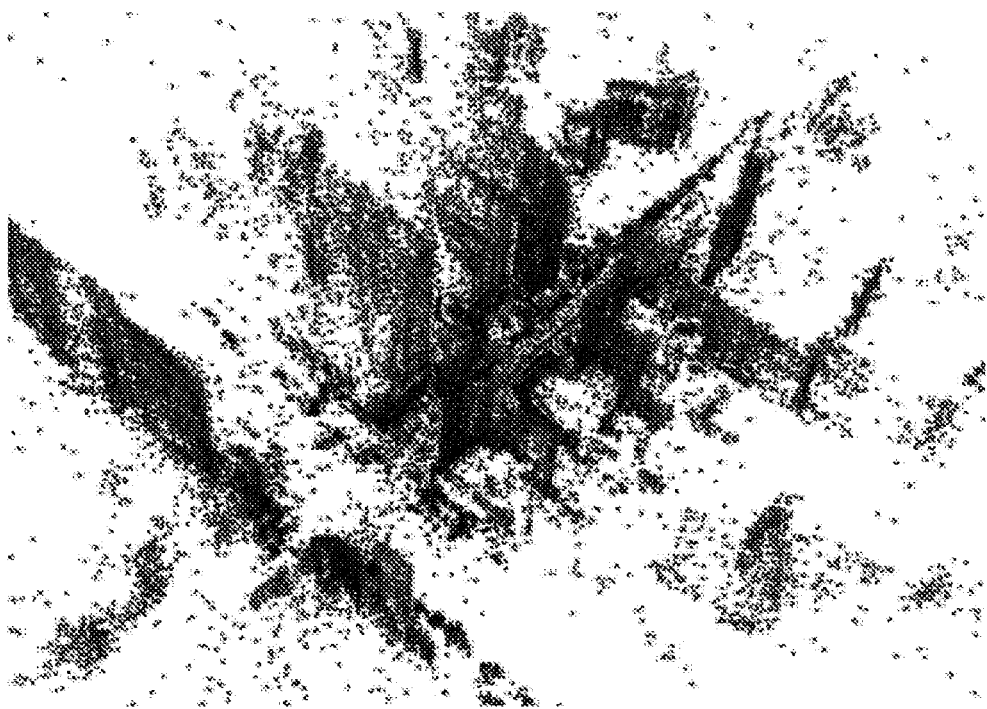
FIG. 13 is an exemplary diagram of first point cloud information and second point cloud information for a plurality of 3D spaces according to an embodiment.

When comparing FIG. 12 and FIG. 13, it can be seen that the density of the first point cloud information and the second point cloud information shown in FIG. 13 is higher than that of the first point cloud information shown in FIG. 12.

That is, it can be seen that denser point cloud information may be generated when the cloud information for the 3D space is generated using both the 360-degree image and the plurality of viewpoint orientation images than when the cloud information for the 3D space is generated using only the 360-degree image.

Figure 14:
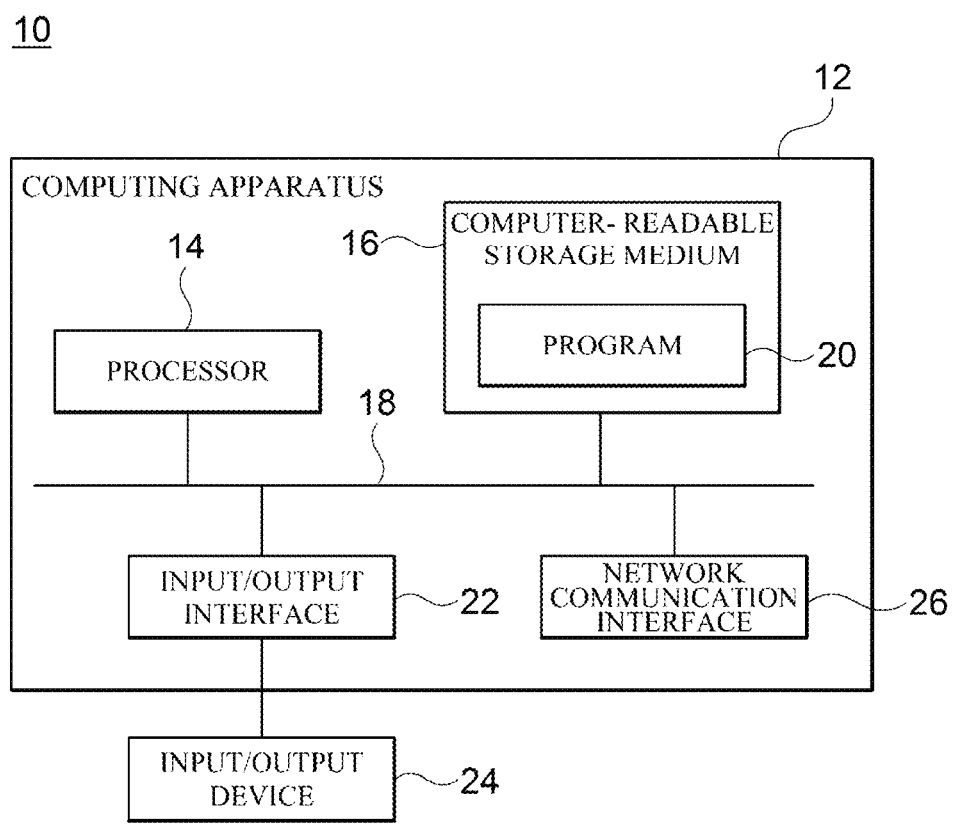
FIG. 14 is a block diagram illustrating a computing environment including a computing apparatus suitable for use in example embodiments.

FIG. 14 is a block diagram illustrating a computing environment including a computing apparatus suitable for use in example embodiments. In the illustrated embodiment, each component may have a function and capability that differ from those described below, and an additional component may be included in addition to those in the following description.

As shown, a computing environment 10 includes a computing apparatus 12. In an embodiment, the computing apparatus 12 may include, for example, one or more components included in the point cloud information generation apparatus 100 or 700 shown in FIG. 1 or FIG. 7.

The computing apparatus 12 includes at least one processor 14, a computer-readable storage medium 16, and a communication bus 18. The processor 14 may enable the computing apparatus 12 to operate according to the aforementioned example embodiment. For example, the processor 14 may execute one or more programs stored in the computer-readable storage medium 16. The one or more programs may include one or more computer-executable instructions which may be configured to enable the computing apparatus 12 to perform operations according to an example embodiment when the operations are executed by the processor 14.

The computer-readable storage medium 16 is configured to store computer-executable instructions, program codes, program data, and/or other suitable forms of information. The program 20 stored in the computer-readable storage medium 16 includes a set of instructions executable by the processor 14. In an embodiment, the computer-readable storage medium 16 may be a memory (a volatile memory such as a random access memory, a non-volatile memory, or an appropriate combination thereof), one or more magnetic disk storage devices, optical disk storage devices, flash memory devices, other forms of storage media that may be accessed by the computing apparatus 12 and are configured to store desired information, or a suitable combination thereof The communication bus 18 connects the processor 14, the computer-readable storage medium 16, and various other components of the computing apparatus 12 to one another.

Also, the computing apparatus 12 may include one or more input/output interfaces 22 for providing an interface for one or more input/output devices 24, and one or more network communication interfaces 26. The input/output interfaces 22 and the network communication interfaces 26 are connected to the communication bus 18. The input/output devices 24 may be connected to other components of the computing apparatus 12 through the input/output interfaces 22. The input/output devices 24 may include input devices such as a pointing device (a mouse, a trackpad, etc), a keyboard, a touch input device (a touchpad, a touch screen, etc.), a voice or sound input device, various kinds of sensor devices, and/or a capture device and/or may include output devices such as a display device, a printer, a speaker, and/or a network card. The input/output devices 24 may be included in the computing apparatus 12 as components of the computing apparatus 12 and may be connected to the computing apparatus 12 as separate devices distinct from the computing apparatus 12.

According to the disclosed embodiments, by generating point cloud information for a 3D space using a 360-degree image for the 3D space and a viewpoint orientation image generated from the 360-degree image, it is possible to reduce a time required to generate the point cloud information for the 3D space, and also it is possible to generate stable and dense point cloud information.

The technical features have been described with reference to the embodiments. However, the disclosed embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. A point cloud information generation apparatus comprising:
   a 360-degree image acquirer configured to acquire a 360-degree image of a three-dimensional (3D) space;
   a point cloud information generator configured to generate first point cloud information for the 3D space from the 360-degree image; and
   a viewpoint orientation image generator configured to generate, based on a plurality of reference viewpoints, a plurality of viewpoint orientation images corresponding to the plurality of reference viewpoints, respectively, from the 360-degree image in the 360-degree image,
   wherein the point cloud information generator is further configured to generate second point cloud information for the 3D space from the plurality of viewpoint orientation images,
   wherein the plurality of reference viewpoints comprises a first reference view point and a second reference view point shifted on the 360-degree image from the first reference viewpoint;
   the plurality of viewpoint orientation images comprises a first viewpoint orientation image which is a first part of the 360-degree image and is generated based on the first reference viewpoint and a second viewpoint orientation image which is a second part of the 360-degree image and is generated based on the second reference viewpoint; and an overlapping region exists between the first viewpoint orientation image and the second viewpoint orientation image.

2. The point cloud information generation apparatus of claim 1, wherein each of the viewpoint orientation images is an image obtained by projecting a region corresponding to a specific viewpoint in the 360-degree image onto a two-dimensional (2D) plane.

3. The point cloud information generation apparatus of claim 1, wherein the viewpoint orientation image generator further configured to generate the plurality of viewpoint orientation images based on at least one of a predetermined image resolution and a field of view (FoV).

4. The point cloud information generation apparatus of claim 1, wherein the point cloud information generator further configured to calculate a correlation between the plurality of viewpoint orientation images based on information for each of the plurality of viewpoint orientation images and generate the second point cloud information based on the correlation.

5. The point cloud information generation apparatus of claim 4, wherein the information for each of the plurality of viewpoint orientation images comprises at least one of location information of each of the plurality of viewpoint orientation images, orientation information of each of the plurality of viewpoint orientation images, and a camera parameter corresponding to each of the plurality of viewpoint orientation images.

6. The point cloud information generation apparatus of claim 4, wherein the correlation comprises at least one of distances between locations corresponding to the plurality of viewpoint orientation images and angles between viewpoint orientations of the plurality of viewpoint orientation images.

7. The point cloud information generation apparatus of claim 1, further comprising a mapper configured to map location information of the 360-degree image to a map including the 3D space.

8. The point cloud information generation apparatus of claim 7, wherein the viewpoint orientation image generator further configured to generate the plurality of viewpoint orientation images based on a coordinate system of the map.

9. The point cloud information generation apparatus of claim 7, wherein the point cloud information generator further configured to generate the second point cloud information based on a coordinate system of the map.

10. A point cloud information generation method comprising:
acquiring a 360-degree image of a three-dimensional (3D) space;
generating first point cloud information for the 3D space from the 360-degree image;
generating, based on a plurality of reference viewpoints in the 360-degree image, a plurality of viewpoint orientation images corresponding to the plurality of reference view points, respectively, from the 360-degree image; and generating second point cloud information for the 3D space from the plurality of viewpoint orientation images, wherein the plurality of reference viewpoints comprises a first reference view point and a second reference view point shifted on the 360-degree image from the first reference viewpoint;

the plurality of viewpoint orientation images comprises a first viewpoint orientation image generated based on the first reference viewpoint and a second viewpoint orientation image which is different from the first viewpoint orientation image and which is generated based on the second reference viewpoint; and an overlapping region exists between the first viewpoint orientation image and the second viewpoint orientation image.

11. The point cloud information generation method of claim 10, wherein each of the viewpoint orientation images is an image obtained by projecting a region corresponding to a specific viewpoint in the 360-degree image onto a two-dimensional (2D) plane.

12. The point cloud information generation method of claim 10, wherein the generating of a plurality of viewpoint orientation images comprises generating the plurality of viewpoint orientation images based on at least one of a predetermined image resolution and field of view (FoV).

13. The point cloud information generation method of claim 10, wherein the generating of second point cloud information comprises:
calculating a correlation between the plurality of viewpoint orientation images based on information for each of the plurality of viewpoint orientation images; and
generating the second point cloud information based on the correlation.

14. The point cloud information generation method of claim 13, wherein the information for each of the plurality of viewpoint orientation images comprises at least one of location information of each of the plurality of viewpoint orientation images, orientation information of each of the plurality of viewpoint orientation images, and a camera parameter corresponding to each of the plurality of viewpoint orientation images.

15. The point cloud information generation method of claim 13, wherein the correlation comprises at least one of distances between locations corresponding to the plurality of viewpoint orientation images and angles between viewpoint orientations of the plurality of viewpoint orientation images.

16. The point cloud information generation method of claim 10, further comprising mapping location information of the 360-degree image to a map including the 3D space after the generating of first point cloud information.

17. The point cloud information generation method of claim 16, wherein the generating of a plurality of viewpoint orientation images comprises generating the plurality of viewpoint orientation images based on a coordinate system of the map.

18. The point cloud information generation method of claim 16, wherein the generating of second point cloud information comprises generating the second point cloud information based on a coordinate system of the map.

* * * * *